W. C. BAKER.
STEERING MECHANISM FOR TRACTORS.
APPLICATION FILED JULY 15, 1918.

1,370,579.

Patented Mar. 8, 1921.

3 SHEETS—SHEET 1.

INVENTOR Walter C. Baker
By Fay, Oberlin & Fay
ATTORNEYS.

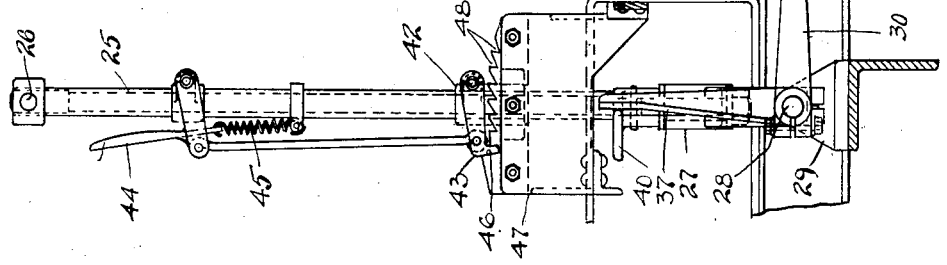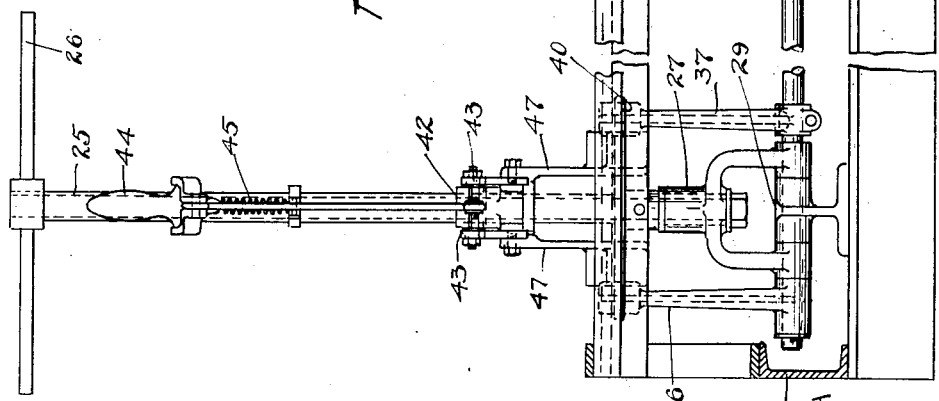

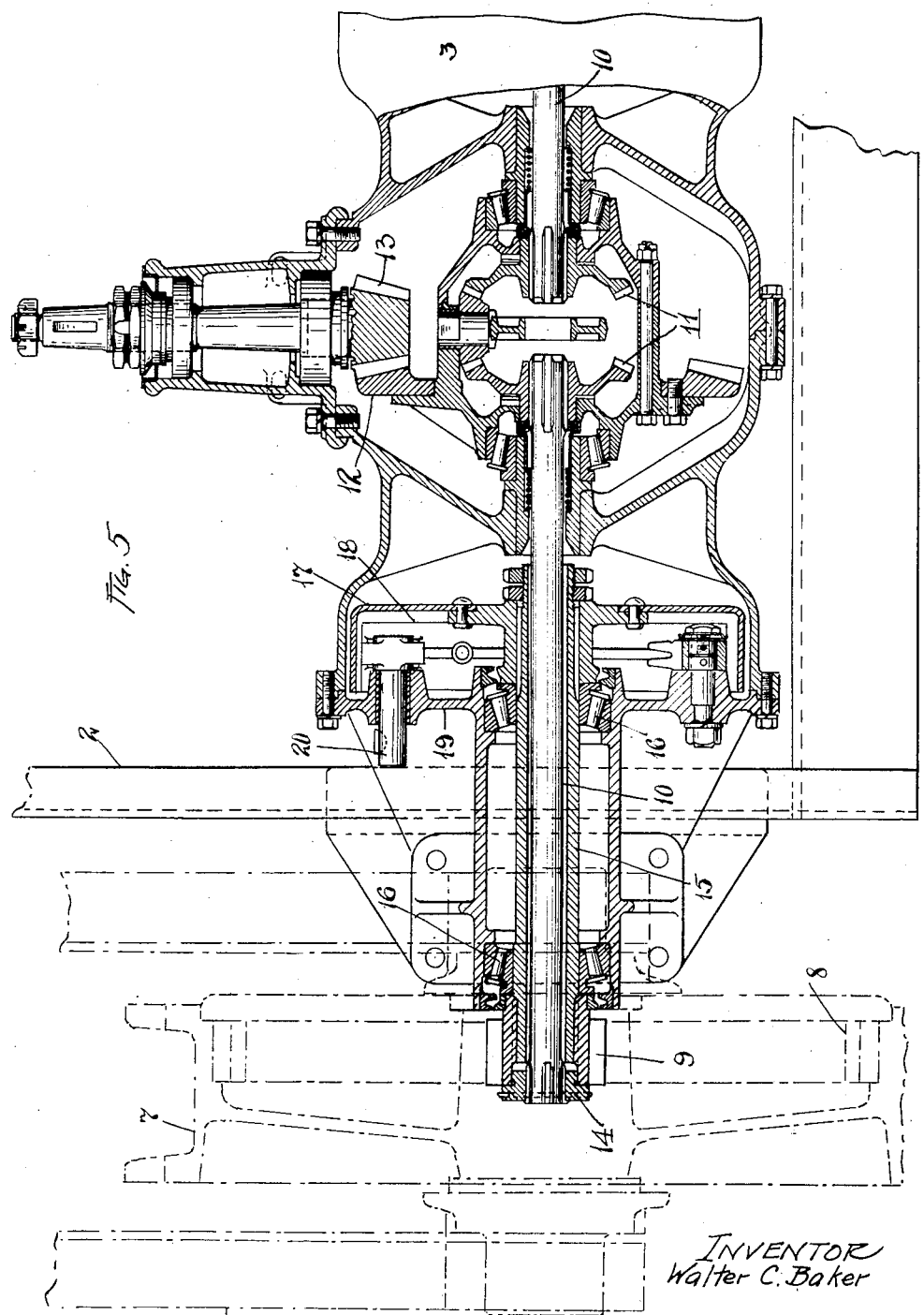

UNITED STATES PATENT OFFICE.

WALTER C. BAKER, OF LAKEWOOD, OHIO, ASSIGNOR TO JAMES J. TRACY, OF CLEVELAND, OHIO.

STEERING MECHANISM FOR TRACTORS.

1,370,579.  Specification of Letters Patent.  Patented Mar. 8, 1921.

Application filed July 15, 1918. Serial No. 244,868.

*To all whom it may concern:*

Be it known that I, WALTER C. BAKER, a citizen of the United States, and a resident of Lakewood, county of Cuyahoga, and State of Ohio, have invented a new and useful Improvement in Steering Mechanism for Tractors, of which the following is a specification, the principle of the invention being herein explained and the best mode in which I have contemplated applying that principle, so as to distinguish it from other inventions.

The present improvements comprise, in effect, combined braking and steering means for tractors and the like, utilization being made of the turning effect of braking one driving member or the other of the machine, in order to steer the same. While of general applicability, the improvements are of special interest in connection with tractors of the so-called planking-tread or portable track type, in which, instead of driving wheels of the familiar sort, an endless track serves as the means of support and propulsion. In this type of tractor, by providing for the selective driving of the one side or the other, the use of separate steering wheels may be entirely eliminated.

The object of the present invention is to provide a single apparatus for thus selectively braking the one traction member or the other and for simultaneously braking both, where it is desired to stop the tractor or slacken its speed. The apparatus, involving as it does the application of brakes to the respective members, includes a novel construction of the driving axle, wherein is mounted the differential that normally serves to equalize the application of power to the traction members.

To the accomplishment of the foregoing and related ends, said invention, then, consists of the means hereinafter fully described and particularly pointed out in the claims, the annexed drawings and the following description setting forth in detail certain mechanism embodying the invention, such disclosed means constituting, however, but one of various mechanical forms in which the principle of the invention may be used.

In said annexed drawings:—

Figure 2:
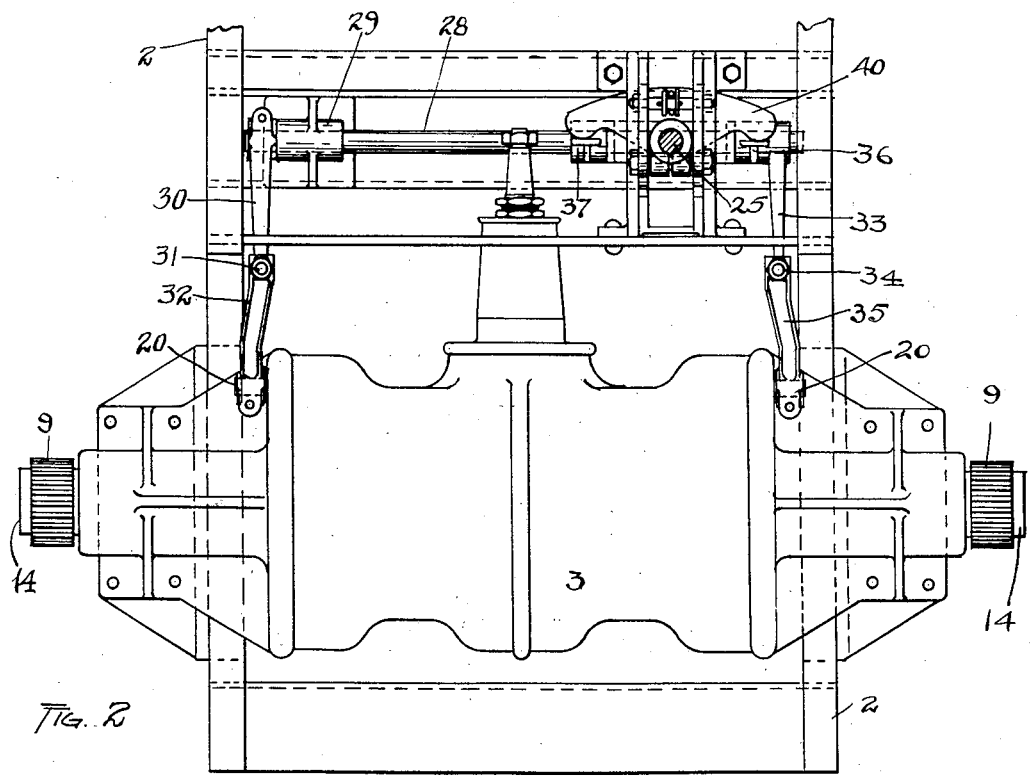
Figure 1:
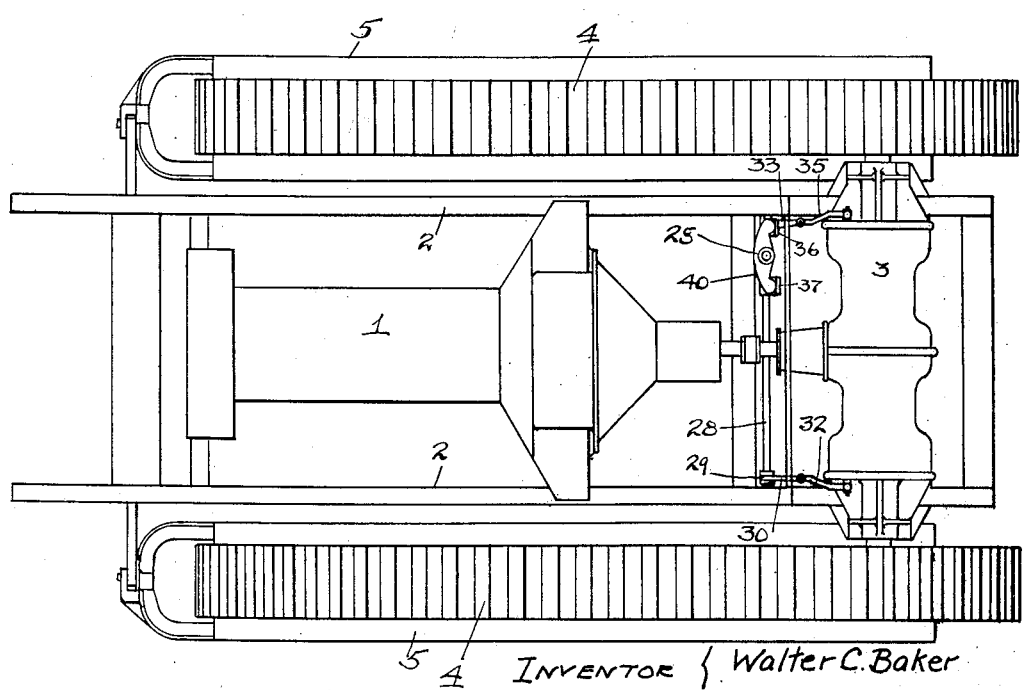

Figure 1 is a plan view more or less diagrammatic of a tractor embodying our present improvements; Fig. 2 is a similar plan view but on an enlarged scale of the rear portion of such tractor, showing the casing in which the driving axle is housed, together with the steering column and connections; Fig. 3 is a front elevational view of such steering column and connections; Fig. 4 is a side elevation of the same; and Fig. 5 is a horizontal section of the driving axle, showing the differential and braking mechanism that are housed therein.

Details of the power plant, as well as of other appurtenant mechanism, being of no interest in the present connection, are not shown in the foregoing drawings, such power plant consisting, as illustrated, of an internal combustion motor 1, mounted on a suitable frame 2, which also serves to support housing 3 for the driving axle, and the combined steering mechanism, which are of present interest. Said frame, together with the mechanism thus carried thereby, is intended to be wholly supported upon two similar traction members, one on each side. These, as already indicated, are of the planking-tread type, each consisting of an endless track 4 carried by suitable wheels mounted in frames 5 that are oscillatorily attached to the main frame of the tractor about a shaft 6 (see Fig. 4), directly below the driving axle housing. At the end of each frame is a sprocket wheel 7, (Fig. 5) rotatably mounted upon this same shaft, so that the axis of oscillation of the traction member is concentric with that of such sprocket wheel. The latter is driven by means of an annular gear 8 attached to its inner face, wherewith meshes a pinion 9 on the corresponding end of the driving axle 10.

Said driving axle, as illustrated in Fig. 5 is of two-part full floating construction, the inner ends of the respective sections being splined in the respective large bevel gears 11 of the differential. The drum of such differential is driven through a bevel gear 12 thereon and a bevel pinion 13 on the propeller shaft, as usual. The outer end of such axle section 10 is secured by means of a clutch plate 14 to the corresponding pinion 9, the latter being keyed on the outer end of a tubular shaft 15 that surrounds and is concentric with said axle section, being rotatably supported in antifriction bearings, specifically roller bearings 16 disposed to take up the end thrust, as well as sustain the weight of said tubular shaft and of the driving axle section, so far as imposed thereon through the connection at the outer ends.

Keyed upon the inner end of each tubular shaft 15, so as to lie within the side members of the main frame 2 of the tractor, is a brake drum 17 and coöperative with the latter, a brake 18 of the expanding type is provided, being carried on a transverse wall 19 in the housing, which also serves to support the oscillatory shaft 20, whereby said brake is actuated.

While only the one brake drum and brake, with the other parts of the driving axle just described, are shown in Fig. 5, viz., those located on one side of the differential it will be understood that the construction is the same on the other side, a corresponding rock-shaft 20 for actuating the brake on this side being provided. Obviously, by rocking one or the other of these shafts, the corresponding brake may be applied, so as to retard or stop the drive on that side of the machine; or by rocking both shafts simultaneously, both brakes will be set and the machine stopped, or else its movement retarded.

The means for thus actuating the respective rock-shafts 20, and thus the brakes controlled thereby, are shown in detail in Figs. 2, 3 and 4. Said means include as a principal actuating element a steering column 25 preferably provided with a cross-head 26, forming laterally extending handles at its upper end, whereby said column may be either rotated about its axis in one direction or the other, as desired, or may be oscillated in a vertical plane longitudinally of the axis of the machine. To this end, said column is rotatably mounted in a socket 27 formed in a yoke that is oscillatory about a shaft 28 supported transversely of the tractor frame 2, a short distance in front of the driving axle housing 3, suitably alined bearings 29 on the frame being provided for this purpose.

This shaft carries, fixedly attached thereto at its one end, a lever 30 that is connected by a suitable adjustable link 31 with a lever 32 on the rock-shaft 20 of the adjacent brake; while on the other end of said shaft 28 there is oscillatorily mounted a bell-crank, the one arm 33 of which corresponds in disposition with the lever just referred to, and is similarly connected through an adjustable link 34 with a lever 35 on the rock-shaft 20, that forms the operating means for the other brake. The other arm 36 of said bell-crank extends vertically alongside of the steering column, and, corresponding thereto, there is fixedly attached to the shaft 28 a lever arm 37 on the other side of the column, which likewise extends alongside of the same.

Fixedly secured to the column 25 adjacent to its lower end is a cross-bar 40 of the form clearly shown in Fig. 2, the respective ends of which are rounded to bear against the upper ends of the levers 36 and 37, respectively, such upper lever ends being flattened to present an adequate contacting face for the arm.

Pivoted to a sleeve 42 rotatably mounted on the column are two pawls 43 that are adapted to be raised through the medium of a hand-lever 44, located just below the cross-arm at the upper end of said column, said pawls being normally depressed by means of a tension spring 45, as shown in Fig. 4. These pawls normally engage rectangular notches 46 in parallel plates 47 fixed to the tractor frame one on each side of the column, so as normally to hold the latter in approximately vertical position; but upon raising said pawls, by means of the hand-lever 44, they may be brought into engagement with one pair or another of the saw-tooth notches 48 in said plate immediately to the rear of said rectangular notches 46.

From the foregoing description of the construction of the steering column and appurtenant parts, including the connections between said column and the rock-shafts 20 of the respective brakes, it will be evident that with the column 25 locked by the pawls 43 in the position shown in Figs. 3 and 4, said column can be only turned about its own axis. The effect of such turning, in one direction or the other, i. e., either clockwise or counter-clockwise, will be to rock one or the other of the lever arms 36 or 37. The rocking of the lever arm 36, which forms part of the bell-crank, will be effective to operate the right-hand brake, as shown in Fig. 2, while rocking of the other lever 37, which is fixed to the shaft 28, will be effective to operate the left-hand brake. The effect of rocking the one brake or the other, as previously explained, is to stop the drive of the corresponding side of the machine, whereupon the other side, by continuing to operate, will turn the machine around through any desired angle.

When it is desired to apply both brakes, the handle 44 is operated to raise the pawls and by the same movement, the operator can pull back on the column 25 with any desired pressure, so as to set the brakes as tightly as may be necessary, in order to either slow down the movement of the tractor or stop it entirely. By releasing the handle 44, with the brakes thus set, the pawls will engage the corresponding saw teeth 48 in the plates and lock the brakes.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:—

1. In mechanism of the character described, the combination of two traction members; a two-part driving axle; a differential connecting the inner ends of said axle-parts, the outer ends thereof being operatively connected with said traction members, respectively; brakes coöperative with said axle-parts, respectively; a column mounted so as to be oscillatory either about its longitudinal axis or a transverse axis, as desired; a cross-bar on said column; and rock-arms adapted to be engaged by said cross-bar upon movement of said column in either fashion described, said arms being operatively connected with said brakes, respectively.

2. In mechanism of the character described, the combination of two traction members; a two-part driving axle; a differential connecting the inner ends of said axle-parts, the outer ends thereof being operatively connected with said traction members, respectively; brakes coöperative with said axle-parts, respectively; a column mounted so as to be oscillatory either about its longitudinal axis or a transverse axis, as desired; means adapted to lock said column against oscillation about its transverse axis; a cross-bar on said column; and rock-arms adapted to be engaged by said cross-bar upon movement of said column in either fashion described, said arms being operatively connected with said brakes, respectively.

3. In mechanism of the character described, the combination of two traction members; a two-part driving axle; a differential connecting the inner ends of said axle-parts, the outer ends thereof being operatively connected with said traction members, respectively; brakes coöperative with said axle-parts, respectively; a column mounted so as to be oscillatory either about its longitudinal axis or a transverse axis, as desired; means adapted to lock said column in desired position about its transverse axis; a cross-bar on said column; and rock-arms adapted to be engaged by said cross-bar upon movement of said column in either fashion described, said arms being operatively connected with said brakes, respectively.

4. In mechanism of the character described, the combination of two traction members; a two-part driving axle; a differential connecting the inner ends of said axle-parts, the outer ends thereof being operatively connected with said traction members, respectively; brakes coöperative with said axle-parts, respectively; a transverse rock-shaft; a socket oscillatory on said shaft; a column oscillatory about its own axis in said socket; a cross-bar on said column; a lever fixed on said shaft and operatively connected with one of said brakes; a second lever fixed on said shaft alongside said column and adapted to be engaged by one end of said bar; and a bell-crank oscillatory on said shaft, one arm of said bell-crank being operatively connected with the other brake and the other arm thereof lying alongside said column and adapted to be engaged by the other end of said bar.

Signed by me, this 11th day of July, 1918.

WALTER C. BAKER.